United States Patent [19]
Donsbach

[11] 3,741,391
[45] June 26, 1973

[54] APPARATUS FOR ELIMINATING OIL SLICKS FROM LARGE BODIES OF WATER

[76] Inventor: Ferdinand Philipp Donsbach, Rudesheimer Str. 35b, 655 Bad Kreuznach, Germany

[22] Filed: Jan. 13, 1971

[21] Appl. No.: 106,202

[30] Foreign Application Priority Data
June 19, 1970 Germany.................. P 20 30 209.4

[52] U.S. Cl............ 210/123, 210/DIG. 21, 210/242
[51] Int. Cl............................................. B01d 23/00
[58] Field of Search................ 210/125, 126, 128, 210/169, 83, 242, DIG. 21, 123

[56] References Cited
UNITED STATES PATENTS

| | | | |
|---|---|---|---|
| 3,245,539 | 4/1966 | Earle............................ | 210/DIG. 21 |
| 3,635,342 | 1/1972 | Mourlon et al..................... | 210/242 |
| 2,579,304 | 12/1951 | Crawford........................ | 210/242 X |
| 3,508,652 | 4/1970 | Woolley....................... | 210/DIG. 21 |
| 3,534,859 | 10/1970 | Amer et al................... | 210/DIG. 21 |
| 2,906,285 | 9/1959 | Rosten et al....................... | 210/126 |
| 3,428,178 | 2/1969 | Nash............................. | 210/242 X |
| 3,567,020 | 3/1971 | Whitaker........................... | 210/169 |

FOREIGN PATENTS OR APPLICATIONS

| | | | |
|---|---|---|---|
| 866,659 | 4/1961 | Great Britain..................... | 210/169 |
| 425,647 | 10/1965 | Switzerland....................... | 210/242 |
| 804,368 | 11/1958 | Great Britain..................... | 210/242 |

OTHER PUBLICATIONS

Auslegeschridt, 1,284,363 Rheinwerdt GmbH Co. 4/17/69

Primary Examiner—Samih N. Zaharna
Assistant Examiner—T. A. Granger
Attorney—Christen, Sabol & O'Brien

[57] ABSTRACT

Water contaminated with an oil slick is drawn into and confined within a large tub shaped vessel so that the lighter contaminating liquid can be drawn off at the top while the water is pumped away from a lower level.

12 Claims, 4 Drawing Figures

PATENTED JUN 26 1973 3,741,391
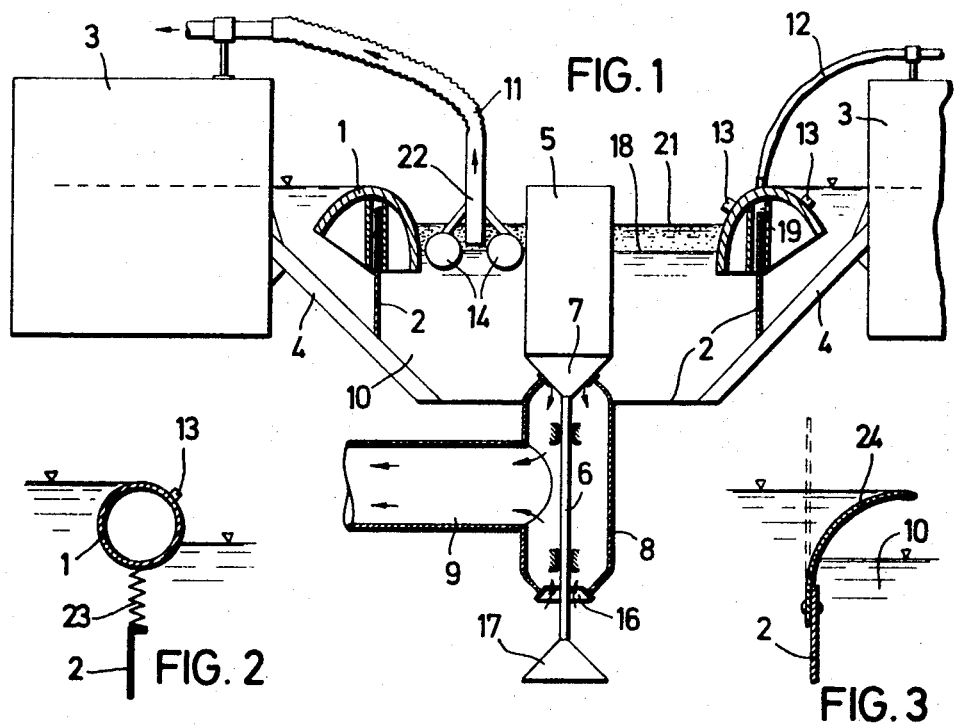
FIG. 1
FIG. 2
FIG. 3
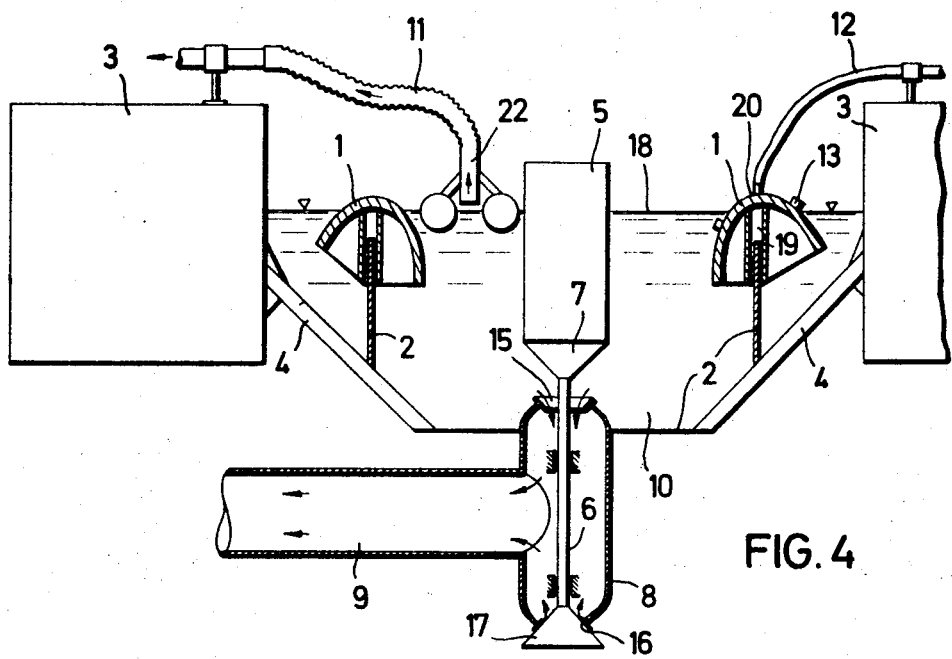
FIG. 4

APPARATUS FOR ELIMINATING OIL SLICKS FROM LARGE BODIES OF WATER

Liquid substances, such as an oil slick, floating on the surface of the water in large quantities, cause considerable damage, as is well known, to the animal and plant life existing on the banks and on the shores as well as in and on the water. This damage will occur especially when these substances drift on the water in the form of large puddles.

Devices have been known whereby water and liquid rising to the surface are moved by means of a paddle wheel into a limited space. At the same time, the water and the rising liquid are unavoidably mixed with one another. It is then necessary for the water and the liquid that is to be eliminated to be first separated again in the confined space, which takes a certain amount of time. The rising liquid that is to be eliminated is conducted into a tub arranged in a limited space in the layer of the water surface and it is pumped from this tub while the water leaves the limited space again on the bottom through a bottom provided with holes. Since water and the liquid to be eliminated are already mixed during conveyance into the limited space, it is not possible in economically justifiably time periods to pump away only the liquid that is to be eliminated, particularly since it is still contaminated more or less with water. Rather, what happens is that the mixture is pumped off, which consists predominantly of water, in which the liquid to be eliminated is concentrated.

Furthermore, installations have been known which have an oil collecting container which can be moved up and down and is held on pontoons, with openings on the sides in front of which intakes are arranged. On the underside of the intakes there are flaps arranged in the manner of hinges which close and extend said intakes and are supported outside the hinges and below the surface of the water by the pontoons. When the collecting container is filled, the latter lies deep in the water. The flaps then close the intakes. When emptying the collecting container, the latter rises, the flaps are lowered until the outside end lies on the surface of the water. Then a mixture of water and liquid to be eliminated flows in from the outside until the collecting container is again filled to such a point that the ends of the flap again project from the water.

Layers of liquid to be eliminated which float on the water are, generally speaking, only very thin. As a rule, the depth of the layer is so insignificant that the layer alone will not move across the flaps into the collecting container from the outside without some action. It therefore is necessary, in order to obtain a flow in the direction of the collecting container, to submerge the ends of the flaps to a depth which considerably exceeds the thickness of the layer that is to be eliminated. Consequently, considerably more water than liquid to be eliminated will flow into the collecting container.

The object of this invention is the avoidance of a thorough mixing of the liquids floating on the surface prior to skimming it off and to provide that only as much as possible of the rising liquid is skimmed off.

This problem is solved by an arrangement having a limited space arranged in the water, into which the liquids to be eliminated flow and by means, for example, pumps, for the conveyance of the liquids which have come into the limited space. This space has two conveying systems, such as pumping systems, that are operated independently of one another, individually or jointly, one system of which will suck water from below the boundary surface between the water and liquid eliminated, downwards, and the second system will suck the liquid that is to be eliminated from the confined space into which it has flown because of the water flow to this space caused by the pumping of the first system.

However, it has turned out that in the case of this arrangement, the upper termination of the confined area in the form of a floating wreath leads to disturbances and does not always adapt itself quickly enough to the surface of the water when said surface is in motion.

The object of the present invention is to make the confined area, with regard to its upper edge, in such a way that the device will operate faultlessly even if the surface of the water is in motion.

This problem will be solved essentially by the fact that the confined area consists of a ring arranged in the water, which, in case the pumping system is switched off or the rate of pumping is insufficient, will project with its upper edge from the surface of the liquid and, in the case of sufficient pumping rate, will lie with its upper edge below the liquid surface outside of the confined area.

When water is sucked from the confined surface by such a device by means of the system conveying the water, the water level drops and with it the liquid level in this confined space. In the case of a ring capable of floating, said ring then assumes a middle position between the liquid surface in the confined space and outside the confined space. In the case of a sufficiently deep drop of the level in the confined space, this middle position is such that the liquid and possibly water will flow into the confined space from the outside over the upper edge of the ring. The more liquid and water that is conveyed from the confined space, the deeper the level in the confined space will drop and thus also the ring. The much more liquid and possible water will therefore flow across the upper edge of the ring into the space until an equilibrium occurs between the sucked away quantity and the inflowing quantity. The system conveying the liquid that is to be eliminated in this case will be switched off only when a layer of this liquid has built up on the water in the confined space which is so thick there is practically no danger that water too will be sucked away with this system.

Further characteristics of the invention are shown in the description taken in connection with the accompanying drawings.

The invention is illustrated by way of an example in FIGS. 1 to 4, without being limited to these embodiments.

FIG. 1 shows a croSs-section through a device according to the invention with the pumping systems switched on;

FIG. 2 shows a section of the device according to FIG. 1, where the hollow ring is attached to the vessel by means of bellows;

FIG. 3 shows a section of the device according to FIG. 1, with a ring made of a rubber elastic material with the pumping system switched on; and FIG. 4 shows the device according to the invention with the pumping systems switched off.

In the figures, the numeral 10 indicates a body of contaminated water which is confined by a generally cylindrically shaped vessel 2, while numeral 1 indicates a buoyant ring. In the bottom of the vessel 2, a tubular sleeve 8 is arranged, to which is attached laterally the conveying system 9 for sucking off the water from the confined space 10. The opening 15 at the upper end of the sleeve 8 lying in the space 10 can be closed by a valve body 7 and the opening 16, located in the open water, can be closed by valve 17. The two valve bodies 7 and 17 are connected with one another by way of the guide rod 6. Numeral 5 indicates a float for the two valves. If the water level 18 in the confined space has dropped to a point where the valve body 7 rests in the opening 15, then no water can be moved by means of the conveying system 9 from the space 10. The conveying system 9 then sucks only outside water through opening 16. In that way it will prevent liquid which is to be eliminated, from being sucked through the conveying system 9 from the space 10 and again fed to the outside water. The ring 1 may have an annular groove 19 in its undersurface, which seallngly engages with the upper marginal wall of the vessel 2. Numeral 20 is the upper surface of the ring 1, 21 is the surface of the liquid to be eliminated and 11 the conveying system for sucking off the liquid that is to be eliminated from the confined space 10. Ring 1 is freely movable in a perpendicular direction.

In the figure there are furthermore floats 14 which carry the intake stack 22 for the liquid that is to be eliminated, 13 being a connection for a heating system, for example, steam heating system, while 12 is a gas connection, for example, an air connection, through which gas can be forced into the hollow ring 1. The numeral 4 represents arms attached to the vessel 2, the other ends of which are attached to floats 3, which support the entire device.

When water is sucked from the confined space 10 by means of the pumping system 9 below the interface between the water and the liquid to be eliminated, as indicated by numeral 18, the water level 18 in this space 10 drops. The floatable ring 1 is capable of limited vertical and angular movement with respect to the remainder of the vessel 2 so that it may assume a middle position between the two liquid levels inside and outside the space 10 until liquid that is to be eliminated and some water will flow into the space 10 across the upper edge 20. As soon as the layer of liquid that is to be eliminated is so thick in the confined space that there is no longer any danger that water will be sucked from the confined space by means of the conveying system 9, this pumping system is switched on.

In the design according to FIG. 2, the hollow ring 1 is attached to the upper edge of vessel 2 by means of a bellows 23.

In the case of the design according to FIG. 3, a continuous annular strip 24 made of elastomeric material, for example, rubber, is attached at the upper edge of vessel 2 instead of to a floatable ring. In the case of this design, when the liquid and water levels are lowered in the confined space 10, the annular strip then bends toward the inside and the liquid to be eliminated and possibly some of the water will flow into the space 10. The lower the liquid level drops in the space 10, the more strip 24 will bend and the more liquid, and Possibly, water will flow into the space 10, until an equilibrium occurs between the performance of the two conveying systems and the inflowing quantity.

The claims are:

1. Apparatus for removing oil slicks from an open body of water comprising a large tub means for confining a large body of water contaminated by an oil slick, said tub means terminating at the top in a peripherally extending upper edge means, flotation means for supporting said tub means with said upper edge substantially at the surface of a body of water to admit oil slick into the interior of the tub means, first pumping means including first inlet means in communication with the bottom of the interior of the tub means for drawing water and oil slick into the interior of the tub means over said upper edge means and for removing water from the tub means and including a second inlet means in communication with said large body of water, and second pumping means including second inlet means in communication with the interior of the tub means for removing oil slick from the interior of the tub means, float valve means to control the level of water in said tub means said float valve means being connected with said first and second inlet means to alternatively close one of said inlet means and open the other of the respective inlet means in response to the level of the liquid in said tub means, whereby said first pumping means will alternatively withdraw water from the interior of said tub means or from said body of water, and float means to position the level of said second inlet means independently of said valve means.

2. The invention as defined in claim 1, wherein said valve means includes a first opening in communication with the interior of the tub means and a second inlet opening in communication with the body of water exteriorly and below the bottom of the tub means, and means for selectively closing one of said two openings.

3. The invention as defined in claim 2, wherein said valve means includes float means responsive to the level of water confined within the tub means to control the selective closing of said openings.

4. The invention as defined in claim 3, wherein said tub means comprises a vessel having a bottom wall and an open top, said bottom wall being provided with an opening, and said first inlet means includes a vertically disposed sleeve connected at the upper end with said opening and the lower end being disposed in the open body of water, a pair of valve bodies connected with each other to alternatively close the respective opposite ends of the sleeve, conduit means for a pump means and connected with said sleeve medially of the opposite ends thereof, and float means disposed within said vessel and connected with said pair of valve bodies to control said valve bodies in response to the level of water in the vessel.

5. The invention as defined in claim 4, wherein said pair of valve bodies and said float means are connected by a rod extending vertically through said sleeve into the vessel, one of said valve bodies being arranged above the upper end of the sleeve, the other of said valve bodies being arranged below the lower end of the sleeve, the distance between said valve bodies being greater than the length of the sleeve.

6. The invention as defined in claim 1, wherein said tub means includes a vessel having a generally upstanding wall terminating in a generally horizontal upper peripheral margin and said upper edge means comprises a buoyant rim means arranged for relative vertical and angular movement with respect to the margin of the tub means.

7. The invention as defined in claim 6, wherein said buoyant rim means is composed of elastomeric material.

8. The invention as defined in claim 6, wherein said buoyant rim means includes vertically slotted guideway means engageable with the peripheral margin of the vessel.

9. The invention as defined in claim 6, wherein said buoyant rim means includes expansible and contractable bellows means connected between the rim means and the peripheral margin of the vessel.

10. The invention as defined in claim 6, wherein said buoyant rim means includes means for heating the rim means.

11. The invention as defined in claim 6, wherein said buoyant rim means comprises a strip of flexible material surround-said tub means, one edge of the strip being attached to the peripheral wall of the vessel, the other edge of said strip extending upwardly and outwardly with respect to said one edge, said strip being yieldable in response to the relative accumulation of liquid within the tub means.

12. The invention as defined in claim 6, wherein said buoyant rim means is substantially hollow and includes means for introducing a fluid into the interior thereof.

* * * * *